(12) United States Patent
Ni et al.

(10) Patent No.: US 11,709,092 B2
(45) Date of Patent: Jul. 25, 2023

(54) APPARATUS FOR ONLINE VOLUMETRICALLY DETECTING GRAIN YIELD BASED ON WEIGHT CALIBRATION

(71) Applicant: Nanjing Agricultural University, Nanjing (CN)

(72) Inventors: Jun Ni, Nanjing (CN); Jinbo Yang, Nanjing (CN); Yan Zhu, Nanjing (CN); Weixing Cao, Nanjing (CN); Xiaoping Jiang, Nanjing (CN); Yongchao Tian, Nanjing (CN)

(73) Assignee: NANJING AGRICULTURAL UNIVERSITY, Nanjing (CN)

( * ) Notice: Subject to any disclaimer, the term of this patent is extended or adjusted under 35 U.S.C. 154(b) by 539 days.

(21) Appl. No.: 16/998,555

(22) Filed: Aug. 20, 2020

(65) Prior Publication Data

US 2021/0063235 A1 Mar. 4, 2021

(30) Foreign Application Priority Data

Aug. 28, 2019 (CN) .......................... 201910799151.0

(51) Int. Cl.
| | |
|---|---|
| *A01D 41/127* | (2006.01) |
| *G01F 23/26* | (2022.01) |
| *H01F 7/06* | (2006.01) |
| *H02P 29/00* | (2016.01) |
| *B65D 88/32* | (2006.01) |

(Continued)

(52) U.S. Cl.
CPC .......... *G01G 23/01* (2013.01); *A01D 41/127* (2013.01); *G01F 23/265* (2013.01); *G01G 19/086* (2013.01); *G01G 19/12* (2013.01); *H01F 7/064* (2013.01); *H02P 29/00* (2013.01);

(Continued)

(58) Field of Classification Search
CPC ...... G01G 13/02; G01G 19/08; G01G 19/086; G01G 19/12; G01G 23/01; G01F 23/20; G01F 23/265; A01D 41/127; H01F 7/064; H02P 29/00; B65G 2203/0258; B65G 2812/0384; B65D 88/26; B65D 88/32
See application file for complete search history.

(56) References Cited

U.S. PATENT DOCUMENTS

| | | | | | |
|---|---|---|---|---|---|
| 3,734,215 | A | * | 5/1973 | Smith ..................... | G01G 3/142 177/99 |
| 6,150,617 | A | * | 11/2000 | Hart ........................ | G01G 19/08 177/136 |

(Continued)

*Primary Examiner* — Randy W Gibson
(74) *Attorney, Agent, or Firm* — Troutman Pepper Hamilton Sanders LLP (Rochester)

(57) ABSTRACT

The disclosure discloses an apparatus for online volumetrically detecting grain yield based on weight calibration comprising left volumetric granary, right volumetric granary and push board. The left volumetric granary is provided on its bottom with first weighing sensor, and in its side with unload grain port opening and first closing door, the right volumetric granary is provided on its bottom with second weighing sensor, and in its side with unload grain port opening and second closing door, the left volumetric granary and the right volumetric granary are provided on their tops with the push board, the push board is a hollow box structure with a top side and a bottom side both opened, and is slidably mounted to a top of the left volumetric granary and the right volumetric granary through a slide driving mechanism.

12 Claims, 3 Drawing Sheets

(51) Int. Cl.
  *G01G 19/08* (2006.01)
  *G01G 23/01* (2006.01)
  *G01F 23/263* (2022.01)
  *G01G 19/12* (2006.01)
  G06F 3/147 (2006.01)
  G01G 13/02 (2006.01)

(52) U.S. Cl.
  CPC ...... *B65D 88/32* (2013.01); *B65G 2203/0258* (2013.01); *G01G 13/02* (2013.01); *G06F 3/147* (2013.01)

(56) References Cited

U.S. PATENT DOCUMENTS

| | | | |
|---|---|---|---|
| 7,211,745 B1 * | 5/2007 | Brown | G01G 19/12 177/83 |
| 2012/0181093 A1 * | 7/2012 | Fehr | G01G 13/242 177/103 |

* cited by examiner

APPARATUS FOR ONLINE VOLUMETRICALLY DETECTING GRAIN YIELD BASED ON WEIGHT CALIBRATION

This application claims the benefit of Chinese Patent Application Serial No. CN201910799151.0, filed Aug. 28, 2019, which is hereby incorporated by reference in its entirety.

FIELD

The disclosure relates to the field of precision agriculture, in particular to an apparatus for online volumetrically detecting grain yield based on weight calibration.

BACKGROUND

The fields yield is an important basis for selecting seeds, sowing and fertilizing for crops in the next season. At present, real time detection mode of yield in a process of harvesting through a combine mainly comprises an impulse type, a photoelectric type, a γ-ray type, a volumetric type and a weighing type. The impulse type sensor is simple in design structure, easy in installation, but difficult in field calibration, and it is susceptible to vibration caused by a harvester itself, resulting in a low measurement precision of yield. The photoelectric type sensor has simple design and low cost, but it is difficult to calibrate in the field and may be influenced by dust and straws and has a low precision of measuring yield. The γ-ray type sensor has relative high precision, but cannot be widely popularized due to its radiation problem. The volumetric type sensor has high measurement precision of yield, but is complex to install and is susceptible to a moisture content and variety of grains. The weighing type sensor is easy to calibrate, but is susceptible to vibration of the harvester under a situation of dynamic weighing, and has a low precision.

SUMMARY

To overcome the defects in the prior art, taking the high precision of the volumetric type sensor and the high stability of a static weight calibration together, the disclosure provides an apparatus for online volumetrically detecting grain yield based on weight calibration, which achieves a high-precision detection of the grain yield in real time based on a method combining a dynamic volume measurement and a static weight calibration, and overcomes the defect of the traditional measurement mode susceptible to moisture content and variety of grain and harvester vibration.

In order to achieve the above purpose, the disclosure provides the following technical solution: an apparatus for online volumetrically detecting grain yield based on weight calibration. comprising a left volumetric granary, a right volumetric granary and a push board, wherein the left volumetric granary is provided on its bottom with weighing sensor A, and in its side with an unload port switching door A, the right volumetric granary is provided on its bottom with weighing sensor B, and in its side with an unload grain port opening and closing door B, the push board is arranged on tops of the left volumetric granary and the right volumetric granary, the push board is a hollow box structure with its top side connected with its bottom side, and is slidably mounted to tops of the left volumetric granary and the right volumetric granary through a slide driving mechanism.

Further, the weighing sensor A and the weighing sensor B are connected with a control circuit module via signal wires, detected data from the weighing sensor A and the weighing sensor B are transmitted in a wireless communication by the control circuit module to a graphic display device for online displaying a yield of a harvest and generating a yield graph.

Further, the slide driving mechanism operates under a control of the control circuit module, and comprises sliding rods and sliding blocks which are arranged on two sides of the push board, a motor used for driving, a gear and a rack, the sliding blocks are fixed on two sides of the push board and sleeved on the sliding rods, the motor is fixedly mounted on the push board, and the gear is mounted on a drive shaft of the motor, a forward or backward rotation of the motor is controlled by the control circuit module, the gear is engaged with the rack, two ends of the rack are fixed above two volumetric granaries.

Further, the unload port switching door A and the unload port switching door B are opened or closed though power-on or power-off of an electromagnets under the control of the control circuit module.

Further, the left volumetric granary is provided on its bottom with an electromagnet A, the right volumetric granary is provided on its bottom with an electromagnet B, and the unload port switching door A and the unload port switching door B are provided respectively with a steel bar A and steel bar B in cooperation with the respective electromagnet A and electromagnet B.

Further, the control circuit module comprises a micro control unit, an electromagnet driving module, a motor control module, a volumetric granary state detection module and a wireless communication module.

Further, AD chips HX711 are employed in the weighing sensor A and weighing sensor B to communicate with a master control chip of the micro control unit via serial port; the electromagnet driving module is set up by employing a high-power MOS (metal oxide semiconductor) transistor which is controlled to be on or off by a high or low level of an IO (input/output) port, so as to control the attraction of the electromagnets; the motor control module employs PWM wave to control driving of the motor to regulate a speed of the motor, and controls the forward and backward rotation of the motor through setting the IO port; the volumetric granary state detection module is realized by employing a capacitive proximity sensor which is mounted in the push board and outputs voltage when the volumetric granary is full; the wireless communication module is realized by employing NRF24L01 to transmit yield data to an embedded graphic display device and receive command signals from the graphic display device.

Further, the graphic display device comprises: a display screen, employing an HDMI interface to communicate with the embedded graphic display device to display a map, a current position of the harvester and yield data; and a wireless communication module. Realized by employing NRF24L01 to receive the yield data transmitted by the control circuit module and send commands to the control circuit module; and a GPS module, installed at a top of the harvester and sending a geographic position of the harvester to the embedded graphic display device.

Further, the bottom of the left volumetric granary and the right volumetric granary are respectively provided on their respective bottom with a separator A and a separator B which are inclined, and the lower ends of the separator A and the separator B are located at a unload port.

A method for online volumetrically detecting grain yield based on weight calibration, the online detection is performed by employing the apparatus for detecting in claim 1, and the method for detecting comprises the following steps:

in a case of harvesting by a harvester, when the volumetric granary is fully filled at first, the harvester stops and the mass m1 of grains which is accommodable in a single volumetric granary is calibrated by the weighing sensor; after the calibration is finished, the harvester continues to work and can stop several times to calibrate the mass to obtain m2, m3, ..., mi during the harvesting process, and a total times n of fully filling the volumetric granary during the whole harvesting process is counted to finally obtain a total mass $$M = \frac{(m_1 + m_2 + \ldots + m_i)}{i} \times n.$$

The disclosure has the following beneficial effects that: using a measuring process combining the volumetric type and the weighing type the precision of the sensor for volumetrically defect yield is achieved; the influences of moisture content and variety of grain are removed though a process combining volume the static weight calibration; last, the influence of the vibration state of the harvester on the measuring result can be avoided through performing the weight calibration in a state that the harvester is stopped, and thus the yield can be measured in real time in the harvesting process.

Additional aspects and advantages of the disclosure will be given in part in the following description, and a part will be obvious from the following description, or may be appreciated from practice of the disclosure.

Figure 1:
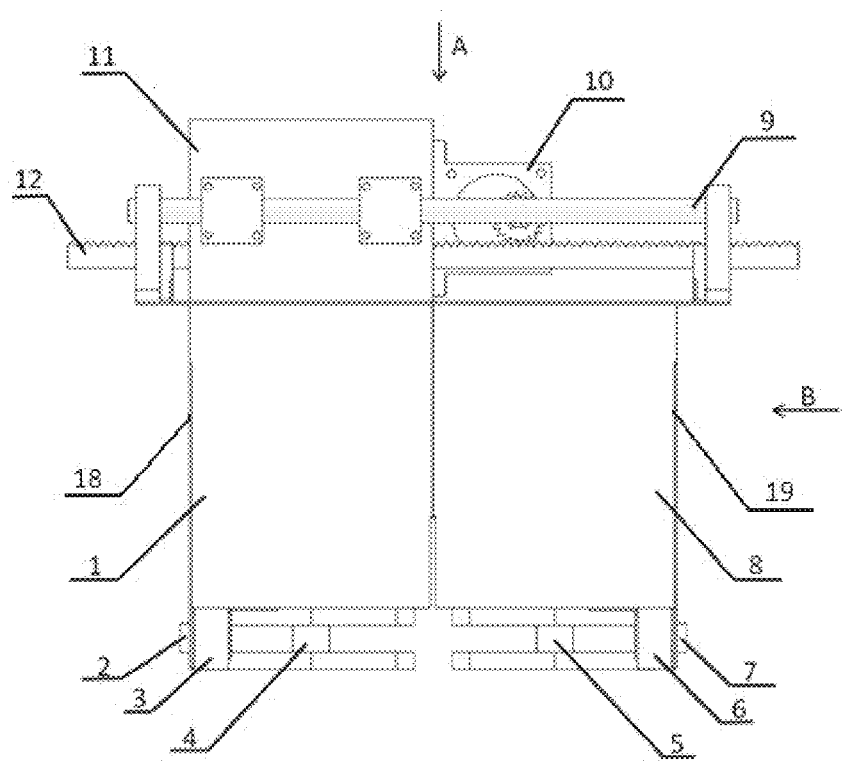
FIG. 1 is a structural schematic illustration of an apparatus for online detecting grain yield using volumetric weighing method.
Figure 2:
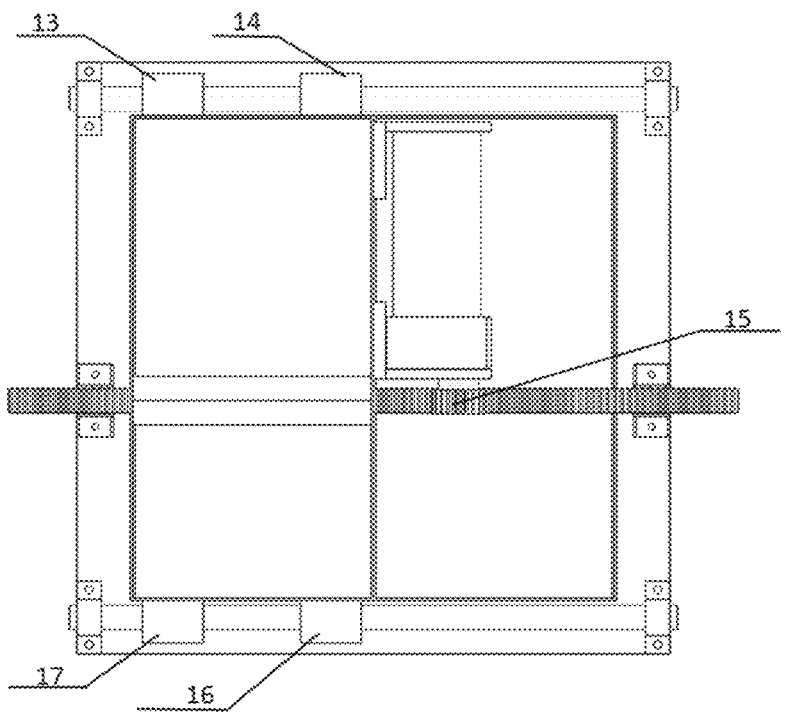
FIG. 2 is a view seeing from A-direction of FIG. 1.
Figure 3:
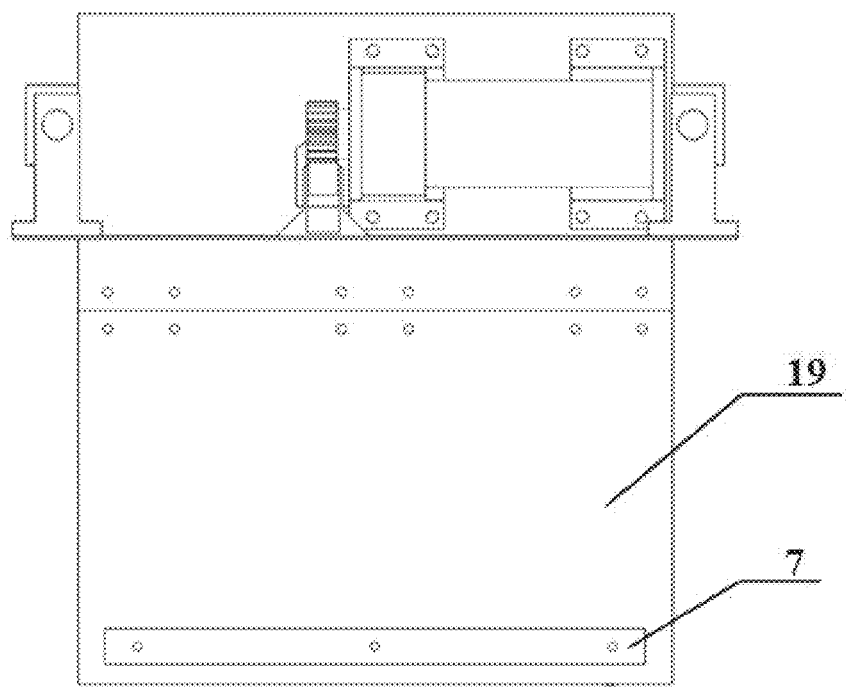
FIG. 3 is a view seeing from B-direction of FIG. 1.
Figure 4:
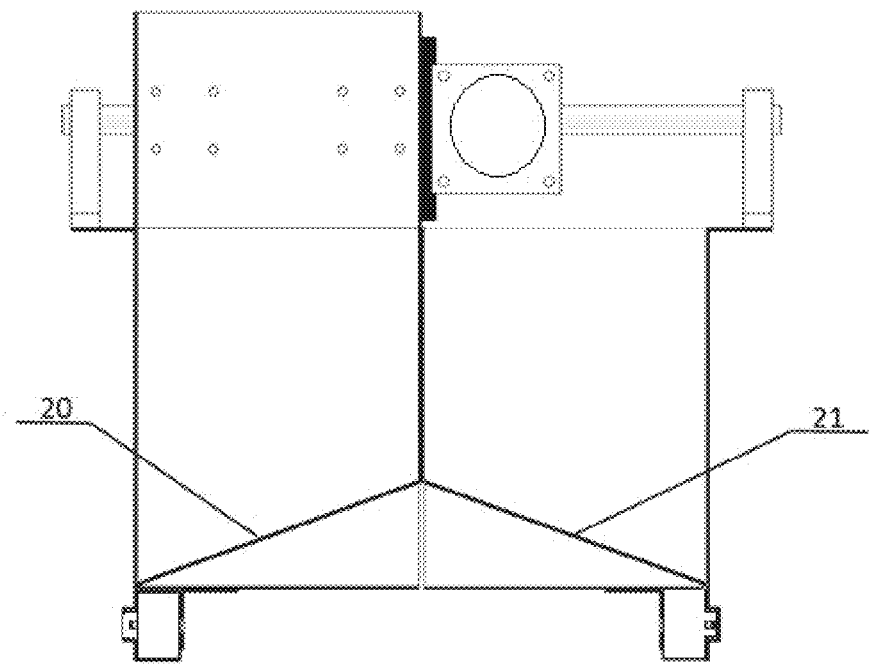
FIG. 4 is a cross-sectional view of FIG. 1.

The reference numerals in the Drawings are as follows: 1—left volumetric granary, 2—steel bar A, 3—electromagnet A, 4—weighing sensor A, 5—weighing sensor B, 6—electromagnet B, 7—steel bar B, 8—right volumetric granary, 9—sliding rod, 10—motor, 11—push board, 12—rack, 13—sliding block A, 14—sliding block B, 15—gear, 16—sliding block C, 17—sliding block D, 18—unload port switching door A, 19—unload port switching door B, 20—separator A, 21—separator B.

DETAILED DESCRIPTION

The disclosure is described in detail below with reference to the figures and the specific embodiments.

As shown in FIGS. 1 to 4, an apparatus for online volumetrically detecting grain yield based on weight calibration comprises a left volumetric granary 1, a right volumetric granary 8 and a push board 11; the left volumetric granary 1 and the right volumetric granary 8 share one side, and a bottom of the two volumetric granaries is provided with a weighing sensor A 4, a weighing sensor B 5, an electromagnet A 3 and an electromagnet B 6; the push board 11 is fixed above the two volumetric granaries through a sliding rod 9, a sliding block A 13, a sliding block B 14, a sliding block C 16 and a sliding block D 17 at a top of the two volumetric granaries, and the push board 11 may reciprocate in a left-right direction along the sliding rod 9. The motor 10 is coupled with the rack 12 through the gear 15, and rotates forwards or backwards to drive the push board to reciprocate in the left-right direction. Meanwhile, the left volumetric granary 1 is provided on a side thereof opposite to the shared side with an unload port switching door A, and the right volumetric granary 8 is provided on a side thereof opposite to the shared side with an unload port switching door B, and the two unload port switching doors are equipped with a steel bar A 2 and a steel bar B 7 respectively. The electromagnet A 3 and electromagnet B 6, when powered on, attract a steel bar A 2 and a steel bar B 7 so as to close the two unload port switching doors, and when powered off, release steel bar A 2 and steel bar B 7, so as to open the two unload port switching doors. A separator A 20 and a separator B 21 are arranged obliquely at respective bottoms of the left volumetric granary 1 and the right volumetric granary 8 respectively, which are respectively divided into an upper portion which is an effective utilization portion and a lower portion by the separator A 20 and the separator B 21. The separators may be angled at 30 degrees relative to bottom surfaces of the weighable volumetric granaries.

In the disclosure, the weighing sensor A and the weighing sensor B are connected with a control circuit module through signal wires, and send detected data to the graphic display device through the control circuit module in a wireless communication, the graphic display device displays a yield of harvest in real time and generates a yield graph. And operations of forward or backward rotation of the motor and the power-on or power-off of the electromagnets are controlled by the control circuit module.

Figure 5:
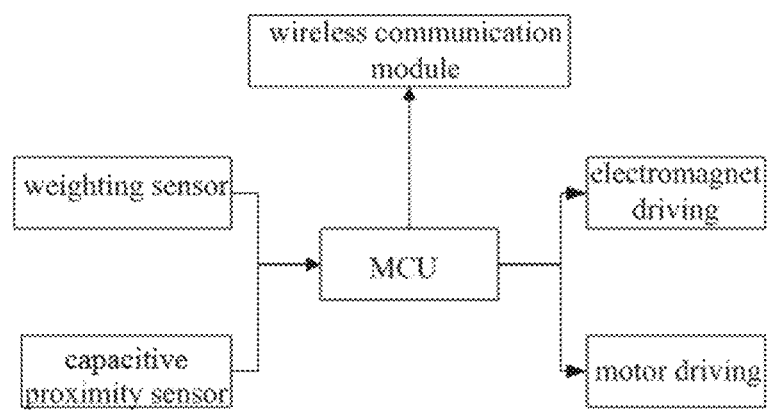
FIG. 5 is a schematic illustration of a portion of a control circuit module.

As shown in FIG. 5, the control circuit module comprises a micro control unit, an electromagnet driving module, a motor control module, a volumetric granary state detection module and a wireless communication module. AD chips HX711 are employed in the weighing sensor A and the weighing sensor B to communicate with a master control chip in the micro control unit via serial ports. The electromagnet driving module is set up by employing a high-power MOS transistor which is controlled to be on or off by a high or low level of an IO port, so as to control the attraction of the electromagnet. The motor control module employs PWM wave to control driving of the motor to regulate a speed of the motor, and controls the forward and backward rotation of the motor through setting IO port. The volumetric granary state detection module is implemented by employing a capacitive proximity sensor mounted in the push board. When the volumetric granary is full, the capacitive proximity sensor outputs a voltage. The wireless communication module is implemented by employing NRF24L01 to transmit yield data to the embedded graphic display device and receive command signals from the graphic display device.

The graphic display device comprises a display screen, a wireless communication module and a GPS module. The display screen employs an HDMI interface to communicate with the embedded graphic display device and is used to indicate a map, a current position of the harvester and yield data. The wireless communication module is implemented by employing NRF24L01 to receive the yield data transmitted by the control circuit module and send commands to the control circuit module. The GPS module is installed at a top of the harvester and sends the geographic position of the harvester to the embedded graphic display device.

In the disclosure, the weighing sensors comprise two X-shaped bearing supports and a cantilever beam. The two X-shaped bearing supports are respectively mounted to an upper surface and an lower surface of the cantilever beam through screws, strain gauges are attached to deformation surfaces (i.e. the upper surface and the lower surface) of the cantilever beam to transform a deformation amount generated by pressure into a pressure value. The weighing sensor has a measurement range of 0-40 kg and the total thickness of 50 mm, and has a bearing surface fixed to the bottom of the volumetric granary through screws, and the weighing sensor is communicated with the control circuit module through signal wires. When a calibration is needed, firstly the left volumetric granary 1 or the right volumetric granary 8 is fully filled, then the harvester is stopped to weigh through the weighing sensor A 4 or the weighing sensor B 5 so as to obtain a weight of the volumetric granary which is full, and finally a total weight is obtained by multiplying a average weight of a single volumetric granary obtained through the calibration and the total number of the full volumetric granary counted. The measuring process is not affected by the vibration and dust of the harvester, and has a high precision of yield measurement.

In the present disclosure, the left volumetric granary and right volumetric granary are each sized to be 2 mm in thickness, 400 mm in length, 200 mm in width, and 250 mm in height, and have no cover on their top, and share one side which is sized to be 400×250 mm. During operation, the single volumetric granary can effectively accommodate the grain of about 15 kg, a speed of feeding the grain into the volumetric granary is 1.5~2 kg/s, and it takes 7.5~10 s to fully fill the single volumetric granary, thus through using the two volumetric granaries to be filled with grain in turn, the work efficiency will be improved.

In the disclosure, the left volumetric granary and the right volumetric granary are both provided, on the respective sides of 400×250 mm and opposite to the shared side, with unload ports of 400×200 mm in size and away from the top of the volumetric granary by 50 mm. Controllable switching doors, i.e. the unload port switching doors A and B, are mounted at each unload port. The controllable switching door is sized to be 400×250 mm. The longer edge of the switching door is used as a rotating shaft, which is superposed with a upper edge line of the unload port, is fixed to the side of the volumetric granary opposite to the shared side through a hinge and are 50 mm away from the top of the volumetric granary which are weighable. The switching door extends beyond the bottom surface of the volumetric granary by 50 mm, a projection portion beyond the bottom surface is embedded with one steel bar of steel grade 42 and 350×20×8 mm in size. The steel bar 7 may be attracted by a electromagnet, so three electromagnets are mounted on the bottom of the volumetric granary. The electromagnets are fixed on an electromagnet support fixed on the bottom surface of the volumetric granary through screws, and an attraction surface of electromagnet is superposed with one surface of the steel bar. The electromagnets are connected with the control circuit through a cable.

In the disclosure, the volumetric granary has a separator provided therein. The separator is superposed at its one side with the lower edge line of the unload port, is angled by greater than 17 degrees relative to the bottom surface of volumetric granary, and divides the weighable volumetric granary into an upper portion and a lower portion, wherein the upper portion is the effective utilization volume. Grains firstly flows into the effective utilization portion of the volumetric granary from the top of the volumetric granary and then flows out from the unload port. If the right volumetric granary 8 is filled with grain, the electromagnet B 6 attracts the steel bar B 7 to close the unload port switching door B 19, and when the right volumetric granary 8 is full and the push board 11 move to a position above the left volumetric granary 1, the electromagnet B 6 release the steel bar B 7, grains push away the unload port switching door B 19 by itself gravity and are discharged from the right volumetric granary B 8. After the grains inside the right volumetric granary are discharged completely, the electromagnet B 6 attract the steel bar B 7 to close the unload port switching door B 19.

In the disclosure the push board has a dimension of 400×200×150 mm, a thickness of 2 mm, and no top and bottom sides. One side of the push board of a dimension of 400×150 mm is parallel to a side of the volumetric granary of a dimension of 400×250 mm, and a bottom side of the push board is in the same plane as the top side of the volumetric granary which is weighable. The push board reciprocate along the left-right direction above the two volumetric granaries, and the reciprocating motion of the push board is achieved by a linear slider and the motor. The linear slider is fixed on a top of the volumetric granary along the left-right direction, and comprises two sliding rods and four sliding blocks. Each sliding rod is sleeved with two sliding blocks, and the sliding block is slidable on the sliding rod along the left-right direction, a side of sliding block is attached to the push board through the screws. The motor is installed on a side of push board, and a rack is provided throughout the push board, the rack is fixed on the top of the volumetric granary and has a length of 600 mm, and the motor is coupled with the rack through the gear and rotates to drive the push board to move.

When feeded, the grains flow from top to bottom into the left volumetric granary 1 through push board 11. When a height of grains in the left volumetric granary 1 exceeds a upper surface of the left volumetric granary 1 by about 5 cm, the push board moves to the right to push the grains of exceeding the upper surface into the right volumetric granary 8. At this time, grains flows from top to bottom into the right volumetric granary 8 through push board 11, to fill the right volumetric granary 8 with grain. When the height of cereal in the right volumetric granary 8 exceeds the upper surface of the right volumetric granary 8 by about 5 cm, the push board moves to the left to push the grains of exceeding the upper surface into the left volumetric granary 1. The above operation are repeated until the harvest is accomplished. In this process, when the volumetric granary is fully filled and stops at first, a mass $m_1$ of grains which are accommodable in a single volumetric granary is calibrated by a weighing sensor. After the calibration is finished, the harvester continues to work and can stop several times to calibrate the mass to obtain $m_2, m_3, \ldots, m_i$ during the harvesting process, and meantime, a total times n of fully filling the volumetric granary during the whole harvesting process is counted to finally obtain a total mass $$M = \frac{(m_1 + m_2 + \ldots + m_i)}{i} \times n.$$

The above shows and describes the basic principles, main features and advantages of the disclosure. It should be understood by those skilled in the art that the above-mentioned embodiments do not limit the protection scope of the present disclosure in any way, and all technical solutions obtained by using equivalent replacement and the like fall within the protection scope of the present disclosure.

The parts uncovered in the disclosure are the same with the prior art or may be achieved by the prior art.

What is claimed is:

1. An apparatus for online volumetrically detecting grain yield based on weight calibration, comprising:
a left volumetric granary, a right volumetric granary and a push board, wherein the left volumetric granary is provided on its bottom with a first weighing sensor, and in its one side with a first unload port switching door, the right volumetric granary is provided on its bottom with a second weighing sensor, and in its one side with a second unload port switching door, the push board is arranged on tops of the left volumetric granary and the right volumetric granary, the push board is a hollow box structure with a top side and a bottom side both opened, and is slidably mounted to the tops of the left volumetric granary and the right volumetric granary through a slide driving mechanism.

2. An apparatus for online volumetrically detecting grain yield based on weight calibration according to claim 1, wherein the first weighing sensor and the second weighing sensor are connected with a control circuit module via signal wires, detected data from the first weighing sensor and the second weighing sensor are transmitted in a wireless communication by the control circuit module to a graphic display device for online displaying a yield of a harvest and generating a yield graph.

3. An apparatus for online volumetrically detecting grain yield based on weight calibration according to claim 1, wherein the slide driving mechanism operates under a control of the control circuit module, and comprises sliding rods and sliding blocks which are arranged on two sides of the push board, a motor used for driving, a gear and a rack, the sliding blocks are fixed on two sides of the push board and are sleeved on the sliding rods, the motor is fixedly mounted on the push board, and the gear is mounted on a drive shaft of the motor, a forward and backward rotation of the motor is controlled by the control circuit module, the gear is engaged with the rack, two ends of the rack are fixed above two volumetric granaries.

4. An apparatus for online volumetrically detecting grain yield based on weight and calibration according to claim 1, wherein the first unload port switching door and the second unload port switching door are opened or closed though power-on or power-off of electromagnets under a control of the control circuit module.

5. An apparatus for online volumetrically detecting grain yield based on weight calibration according to claim 4, wherein the left volumetric granary is provided with on its bottom a first electromagnet, the right volumetric granary is provided on its bottom with a second electromagnet, and the first unload port switching door and the second unload port switching door are provided respectively with a first steel bar and a second steel bar in cooperation with the respective first electromagnet and the second electromagnet.

6. An apparatus for online volumetrically detecting grain yield based on weight calibration according to claim 2, wherein the control circuit module comprises a micro control unit, an electromagnet driving module, a motor control module, a volumetric granary state detection module and a wireless communication module.

7. An apparatus for online volumetrically detecting grain yield based on weight calibration according to claim 6, wherein AD chips HX711 are employed in the first weighing sensor and the second weighing sensor to communicate with a master control chip in the micro control unit via serial ports; the electromagnet driving module is set up by employing a high-power MOS transistor which is controlled to be on or off by a high or low level of an IO port, so as to control an attraction of the electromagnets; the motor control module employs PWM wave to control driving of the motor to regulate a speed of the motor, and controls the forward and backward rotation of the motor through setting the IO port; the volumetric granary state detection module is realized by employing a capacitive proximity sensor which is mounted in the push board and outputs a voltage when the volumetric granary is full; the wireless communication module is realized by employing NRF24L01 to transmit yield data to an embedded graphic display device and receive command signals from the graphic display device.

8. An apparatus for online volumetrically detecting grain yield based on weight calibration according to claim 2, wherein the graphic display device comprises: a display screen, employing an HDMI interface to communicate with the embedded graphic display device to display a map, a current geographic position of a harvester and the yield data; and a wireless communication module, implemented by employing NRF24L01 to receive the yield data transmitted by the control circuit module and send commands to the control circuit module; and a GPS module, installed at a top of the harvester and sending a current geographic position of the harvester to the embedded graphic display device.

9. An apparatus for online volumetrically detecting grain yield based on weight calibration according to claim 1, wherein the left volumetric granary and the right volumetric granary are respectively provided on their respective bottom with a first separator and a second separator which are inclined, and lower ends of the first separator and the second separator are located at the respective unload port.

10. An apparatus for online volumetrically detecting grain yield based on weight calibration according to claim 3, wherein the control circuit module comprises a micro control unit, an electromagnet driving module, a motor control module, a volumetric granary state detection module and a wireless communication module.

11. An apparatus for online volumetrically detecting grain yield based on weight calibration according to claim 4, wherein the control circuit module comprises a micro control unit, an electromagnet driving module, a motor control module, a volumetric granary state detection module and a wireless communication module.

12. A method for online volumetrically detecting grain yield based on weight calibration, the method comprising: in a case of harvesting by a harvester, when the volumetric granary is fully filled at first, the harvester stops and a mass m1 of grains which are accommodatable in a single volumetric granary is calibrated by the weighing sensor; after the calibration is finished, the harvester continues to work and can stop several times to calibrate the mass to obtain $m_2$, $m_3, \ldots, m_i$ during the harvesting process, and a total times n of fully filling the volumetric granary during the whole harvesting process is counted to finally obtain a total mass $$M = \frac{(m_1 + m_2 + \ldots + m_i)}{i} \times n.$$

* * * * *